United States Patent [19]
Hofele

[11] Patent Number: 5,793,326
[45] Date of Patent: Aug. 11, 1998

[54] METHODS OF GENERATING A CLUTTER THRESHOLD AND ARRANGEMENTS FOR EXECUTING THE METHODS

[75] Inventor: Franz Xaver Hofele, Donzdorf, Germany

[73] Assignee: Daimler-Benz Aerospace AG, Ulm, Germany

[21] Appl. No.: 802,162

[22] Filed: Jan. 10, 1997

[51] Int. Cl.$^6$ .............................. G01S 7/292; G01S 7/34
[52] U.S. Cl. ............................................. 342/93; 342/159
[58] Field of Search ..................... 342/93, 159, 195, 342/203

[56] References Cited

U.S. PATENT DOCUMENTS

| | | | |
|---|---|---|---|
| 4,095,222 | 6/1978 | Mooney, Jr. | 342/93 |
| 4,213,127 | 7/1980 | Cole | 342/93 |
| 4,377,811 | 3/1983 | Mooney, Jr. et al. | 342/94 |
| 4,489,319 | 12/1984 | Hansen | 342/93 |
| 4,542,381 | 9/1985 | Wilhelm | 342/93 |
| 4,584,579 | 4/1986 | Frost et al. | 342/189 |

*Primary Examiner*—John B. Sotomayor
*Attorney, Agent, or Firm*—Spencer & Frank

[57] ABSTRACT

A method and arrangement for generating a clutter threshold by means of a CFAR circuit. In the process the partial registers of the CFAR are subdivided into storage blocks each containing a plurality of cell, and a block sum is formed from the sample values stored in each storage block. To form the clutter threshold for a signal under test, the individual block sums are compared in pairs according to a predetermined scheme, during which the greater block sum is determined. From these resulting greater sums, the smallest block sum (minimum) is selected and, from this, the clutter threshold is determined with a predetermined weighing. According to an alternative method, the block sums are sorted according to an order of precedence. Thereafter, block sum having a predetermined ordered rank is selected from the sorted block sums, and the clutter threshold is determined from this selected sum after a predetermined weighing.

10 Claims, 3 Drawing Sheets

FIG 5

METHODS OF GENERATING A CLUTTER THRESHOLD AND ARRANGEMENTS FOR EXECUTING THE METHODS

BACKGROUND OF THE INVENTION

The invention relates to a method of generating a clutter threshold using a Constant False Alarm Rate (CFAR) circuit and to an arrangement for carrying out this method.

The invention is particularly applicable in radar technology. The received echo signals, which contain both target and clutter echoes, are first converted (mixed) in the video signal range and digitized. The video signal, which can have a bandwidth of, for example, up to approximately 20 MHz, is therefore present in the form of a sequence of sample values generated by an analog/digital converter. Generally, a clutter threshold is used to detect a (radar) target. This clutter threshold is a(n amount) threshold value for the (amount or value) video signal. Only the sample values that are greater than the threshold value are used to detect a target. So-called CFAR (Constant False Alarm Rate) circuits are preferably used to generate these values, because they can produce an adaptive clutter threshold. This is necessary if a temporal and/or spatial change to the clutter occurs. For example, in weather-dependent clutter, temporally or spatially changing cloud formations may be present within a monitoring region detected by the radar.

According to FIG. 1, a CFAR circuit of this type essentially includes a shift register having a predetermined number of storage cells and an input E, at which the sample values are present sequentially. The shift register comprises two partial registers S1, S2, between which the so-called cell under test ZUT is located. A sample value present there, also called the signal under test SUT, is supplied to a positive (+) input of a comparator KO. A signal corresponding to the clutter threshold CS is supplied to the negative (−) input of the comparator KO. The output signal produced at the output A of the comparator KO therefore includes only sample values having an (amplitude) amount greater than the clutter threshold. According to FIGS. 1 and 2, this threshold can be determined in different ways.

According to FIG. 1, it is assumed that each of the partial registers S1, S2 comprises (GL)/2 storage cells. Each partial register S1, S2 has an associated summing circuit SU1, SU2. The sample values present in the storage cells of the partial shift register S1,S2 are simultaneously supplied to the associated summing circuits SU1,SU2. An associated partial summing signal is formed in each summing circuit SU1, SU2. The associated mean value is formed from these two partial summing signals in a mean value former SG. In a divider circuit GL, this mean value is divided by the number of storage cells present in the partial registers and subsequently multiplied by a predetermined multiplier in a multiplier circuit K. The output signal of the multiplier circuit K corresponds to the clutter threshold CS. This threshold thus corresponds to a mean value of all sample values contained in the storage cells of the partial registers S1, S2.

The described known method can be used advantageously if no temporally or spatially abrupt changes to the clutter distribution are anticipated. This is the case, for example, in sea clutter (ocean wave motion), because the statistical distribution of sea clutter, which is solely dependent on weather, e.g. storms, is essentially unchanging within a region to be monitored.

However, the known method provides merely a clutter threshold that is of limited use at the most, for example, when the sky is cloudless per se with a forming storm front (cumulus clouds giving good reflection). This is because a clutter associated with the cloudless sky is present in the aforementioned first partial register S1, and a clutter associated with the storm front is present in the cell under test ZUT and the second partial register S2. Thus, a target signal (sample value) of a (radar) target to be detected, which signal is additionally present in the cell under test ZUT, can be recognized as insufficient, because the clutter threshold cannot follow abrupt changes in clutter due to mean value formation.

The arrangement of FIG. 2 is essentially distinguished from the arrangement in FIG. 1 by the fact that, instead of mean value formation, a so-called ordered statistic is used. In this instance, the sample values present in the partial registers S1, S2 are supplied to a sorting apparatus SO and sorted there in ascending or descending order, corresponding to the amount or value. A sample value having a predetermined (amount) rank is then always selected from the sorted sample values with a rank-selection circuit RA, for example, always exactly the mean sample value, that is, the value exactly in the middle of the (amount) order of precedence. This selected sample value is then multiplied by a predetermined multiplier in the multiplier circuit K, resulting in the clutter threshold CS.

It is apparent that a clutter threshold generated in this manner can only insufficiently follow abrupt changes in clutter, because the sorting process requires a considerable amount of processing time, based on the cycle time during which the sample values are generated. This drawback can be at least partially remedied by a very rapidly-operating sorting apparatus. A disadvantage of this apparatus, however, is that it is technologically complex and therefore cost-prohibitive.

It is therefore an object of the invention to provide generic methods with which a clutter threshold that conforms to the clutter behavior, particularly during an abrupt change, can be generated in a reliable and cost-effective manner. A further object of the invention is to provide arrangements for executing the methods.

SUMMARY OF THE INVENTION

The above objects are generally achieved according to a first embodiment of the invention by a method of generating and using a clutter threshold in a Constant False Alarm Rate (CFAR) circuit arrangement, comprising the steps of continuously reading sample values belonging to a digitized video signal into a shift register containing two partial registers separated by a cell under test; subdividing each partial register into an identical number of storage blocks (L), with each storage block containing a predetermined number of storage cells, and with the number of storage cells in each partial register being adapted to the type and size of the region to be monitored by the arrangement; summing all sample values stored in a respective storage block to produce a respective block sum for each storage block; comparing each respective block sum associated with one of the partial registers with a respective block sum associated with the other partial register according to a predetermined scheme to determine, for each comparison the greater block sum of the two compared block sums; selecting the smallest block sum from among all of the determined greater block sums, and weighing the selected smallest block sum corresponding to the number of storage cells contained in a storage block and to a predetermined multiplier to produce a clutter threshold; and comparing the clutter threshold with the sample value contained in the cell under test to output only sample values from the cell under test greater than the clutter threshold.

According to further features-of this embodiment, each storage block contains the same, predetermined number of storage cells, and the storage blocks contained in each partial register are numbered consecutively in the same order, and during the step of comparing the block sums from respective storage blocks (L) of the two partial registers having identical numbers are compared.

A circuit arrangement for carrying out the above embodiment of the method according to the invention comprises: a shift register divided into two partial registers separated by a storage cell under test, with each partial register being subdivided into the same number of storage blocks, each containing a predetermined number of storage cells; a respective summing member connected with the storage cells of each respective block for adding sample values present in the cells of the associated storage block, to provide respective block sums at a respective output, with the respective storage blocks and the respective summing members, of the respective partial registers being numbered consecutively and in the same direction; plurality of a maximum value detectors each connected to the outputs of respective summing members of the two partial having the identical number, for determining the respectively greater of the two compared block sums; a minimum value detector connected to the outputs of all of the maximum value detectors for determining the smallest block sum value; means for weighing the smallest block sum value corresponding to the number of storage cells contained in a storage block and by a predetermined multiplier to form a clutter threshold; and a comparator for comparing the weighted smallest block sum and the sample value stored in the cell under test (ZUT) and for outputting only sample values from the cell under test greater than the weighted smallest block sum.

The above object is achieved according to a further embodiment of the method according to the invention by a method of generating and using a clutter threshold in a Constant False Alarm Rate (CFAR) circuit arrangement which method comprises the steps of: continuously reading sample values belonging to a digitized video signal into a shift register containing two partial registers separated by a cell under test; subdividing each partial register into an identical number of storage blocks, with each block containing a predetermined number of storage cells and with the number of storage cells in each partial register being adapted to the type and size of the region to be monitored by the arrangement; summing all sample values stored in a respective storage block to produce a respective block sum for each storage block; sorting all of the block sums into a predetermined sequence according the their respective sum values; selecting a block sum having a predetermined rank from the sequence of block sums; weighing the selected block sum according to the number of storage cells contained in a storage block and to a predetermined multiplier to produce a clutter threshold; and comparing the clutter threshold with the sample value contained in the cell under test to output only sample valves from the cell under test greater than the clutter threshold.

Preferably each storage block contains the same, predetermined number of storage cells.

A circuit arrangement for carrying out the further embodiment of the method according to the invention comprises: a shift register divided into two partial registers separated by a storage cell under test, with each partial register being subdivided into a predetermined number of storage blocks, each containing a predetermined number of storage cells; a respective summing member connected with the storage cells of each respective storage block for adding sample values present in the cells of the associated storage block to provide respective block sums at a respective output; a sorting arrangement, connected to the outputs of all of the summing members of the two partial registers for sorting the block sums into a predetermined sequence; a rank selector for selecting a block sum having a predetermined rank from the sorted sequence; means for weighing the selected block sum to the number of storage cells contained in a storage block and by a predetermined multiplier to form a clutter threshold; and a comparator for comparing the produced clutter threshold and the sample value stored in the cell under test and for outputting only sample values from the cell under test greater than the clutter threshold.

A first advantage of the invention is that a plurality of temporally consecutive (target) sample values belonging to a (radar) target to be detected can be recognized and outputted.

A second advantage is that, even in the presence of nearly arbitrary clutter, masking of spatially closely-adjacent (radar) targets is avoided. Therefore, a spatially small target can be detected in the direct vicinity of a large target.

Further advantages ensue from the subsequent description.

The invention is described in detail below by way of embodiments, with reference to further schematic drawing figures.

DETAILED DESCRIPTION OF THE PREFERRED EMBODIMENT

Figure 3:
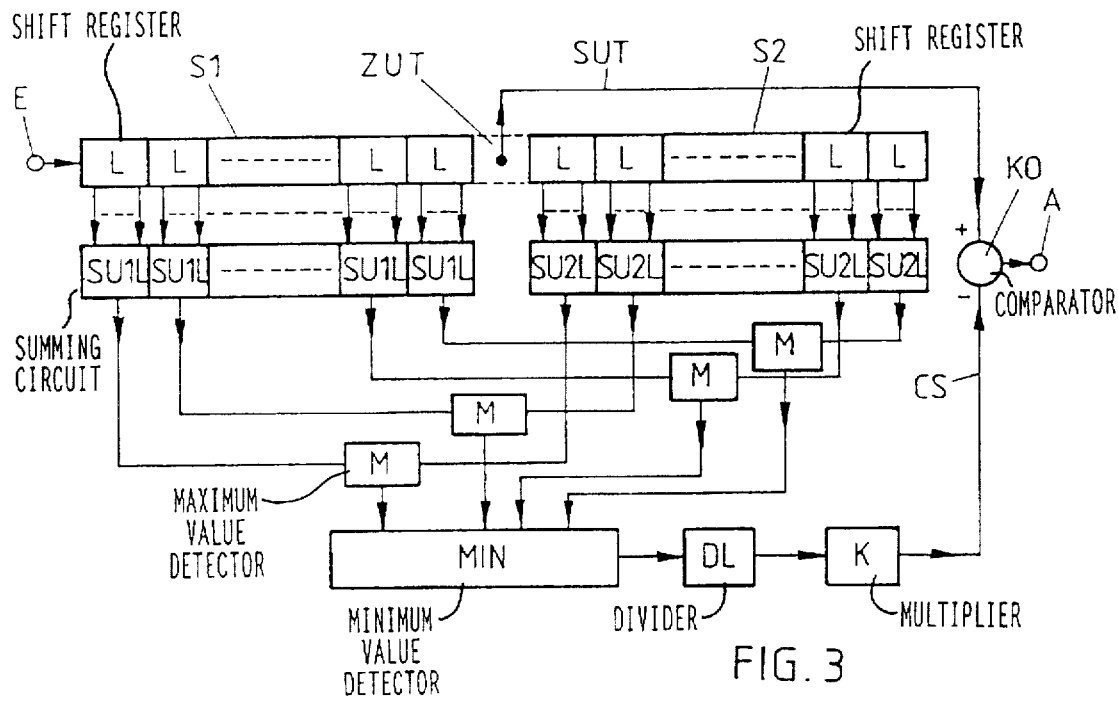
FIG. 3 is a block circuit diagram of a CFAR circuit according to the invention for carrying out a first embodiment of the method according to the invention.

In the circuit corresponding to FIG. 3, the partial registers S1, S2 are subdivided into a plurality of storage blocks L, with each partial register S1, S2 having the same number of storage blocks L. Each storage block L contains a predetermined number of storage cells. All storage blocks L preferably have the same number of storage cells, i.e., the storage blocks are of identical size (length). A separate summing member SU1L, SU2L is associated with each storage block L. The sample values contained in the associated storage cells of a storage block L are added in the respective summing members SU, resulting in so-called block sums. These block sums produced by the respective summing members are now compared in pairs in the associated respective maximum value detector M. During this comparison, the respectively larger block sum is determined in the respective maximum detector M and all such maximum block sums are conducted further to a minimum value detector MIN.

As illustrated, in this pair-wise comparison of the block sums, the same relative storage blocks L of the respective partial register S1 and S2 are always selected, and the respectively greater (maximum) sum is determined from their block sums in the associated maximum value detector M. Thus, the sum from the first block L (adjacent to the input E) of the first partial register S1 is compared to the sum from the first block (adjacent to the cell under test ZUT) of the second partial register S2. The sum from the second block L of the first partial register S1 is compared to the sum from the second block L of the second partial register S2, and so forth. This means that the sum of the last block (adjacent to the cell under test ZUT) of the first partial register S1 is compared to the sum of the last block of the second partial register S2. This comparison is preferably, but not necessarily, effected simultaneously. The number of maximum values resulting in the maximum detectors M is exactly one-half the number of storage blocks L.

The smallest maximum value (minimum) is now selected from all of the maximum values in the minimum detector MIN and conducted further to a divider circuit DL. There, the minimum value is divided by the number of storage cells contained in a storage block L or a predetermined value associated with the storage cells. The result is conducted further to the multiplier K and multiplied there by a predetermined multiplier k, producing the clutter threshold CS. The signal under test SUT originating from the register cell under test ZUT is then compared to the clutter threshold CS in the comparator KO. Only sample values that are larger than the clutter threshold CS are provided at the output A of the comparator KO.

Figure 5:
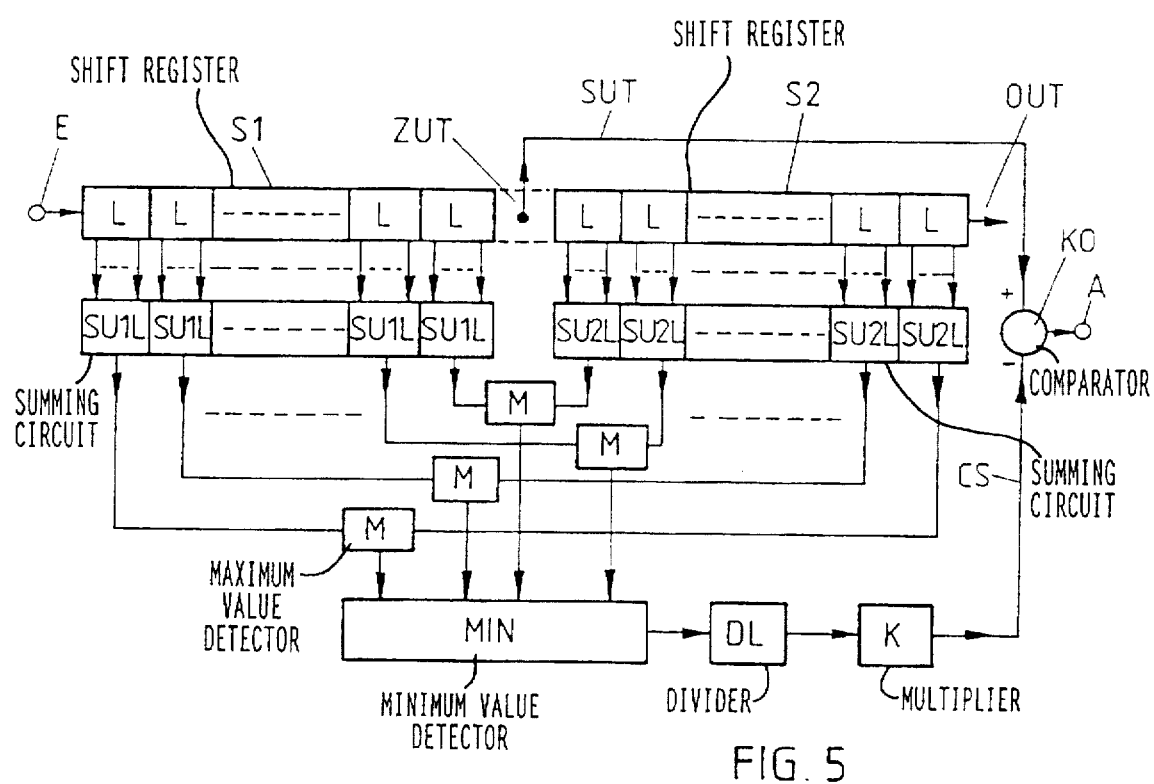
FIG. 5 is a block circuit diagram for a modification of the circuit arrangement of FIG. 3 for carrying out a modification of the first embodiment of the method according to the invention.

The embodiment corresponding to FIG. 5 is distinguished from the embodiment in FIG. 3 solely by an alternative possible circuit arrangement for the plurality of maximum value detectors M. According to FIG. 5, a maximum value is determined from the sum of the first block L of the first partial register S1 and the sum from the last block L of the second partial register S2, a further maximum value is determined from the sum from the second block L of the first partial register S1 and the sum from the second-to-last block L of the second partial register S2, and so forth.

That is, a further maximum value is determined from the sum from the second-to-last block L of the first partial register S1 and the sum from the second block L of the second partial register S2, and finally, a maximum value is determined from the last block L of the first partial register S1 and the sum from the first block L of the second partial register S2. According to FIG. 5, the maximum values determined in this manner are supplied to the minimum value detector MIN and processed as described above with regard to FIG. 3.

The described method is advantageously flexible, that is, it can be adapted extensively to the present clutter situation (type of clutter). This is because the number of storage blocks L in each partial register is correspondingly predetermined. Moreover, the number of storage cells contained in each storage block L can be predetermined, and therefore the total number of storage cells present in each partial register can be predetermined.

In the method, a clutter threshold CS is generated which advantageously follows, delay-free, all possible clutter jumps in a video signal, for example, from a cloudless sky to a rain front, regardless of the bandwidth, for example 20 MHz, of the respectively used video signals.

Figure 4:
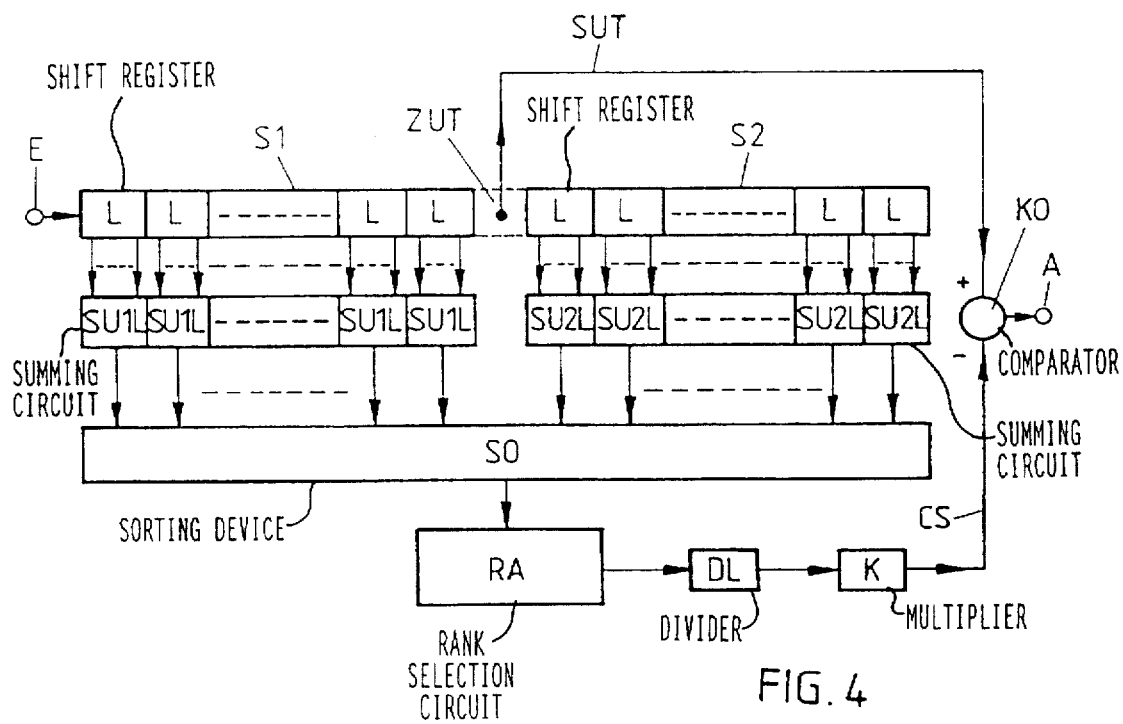
FIG. 4 is a block diagram of a further CFAR circuit arrangement for carrying out a second embodiment of the method according to the invention.

The embodiment according to FIG. 4 is only distinguished from the embodiments in FIGS. 3 and 5 by the fact that the block sums generated in the summing members SU1L, SU2L are supplied to a sorting arrangement SO. There the block sums are selectively sorted into ascending or descending order. A block sum having a predetermined rank, for example, the centermost rank, is selected from this sequence with a rank-selection circuit RA. This selected block sum is then divided by the number of storage cells contained in a storage block L, or an associated, predetermined value, in a divider circuit DL. The result is then multiplied by a predetermined constant in a multiplier K, producing the clutter threshold CS.

The advantages mentioned in conjunction with FIG. 3 are also connected to this embodiment of the method. However, the outlay required for realization is greater because of the sorting algorithm.

Figure 1:
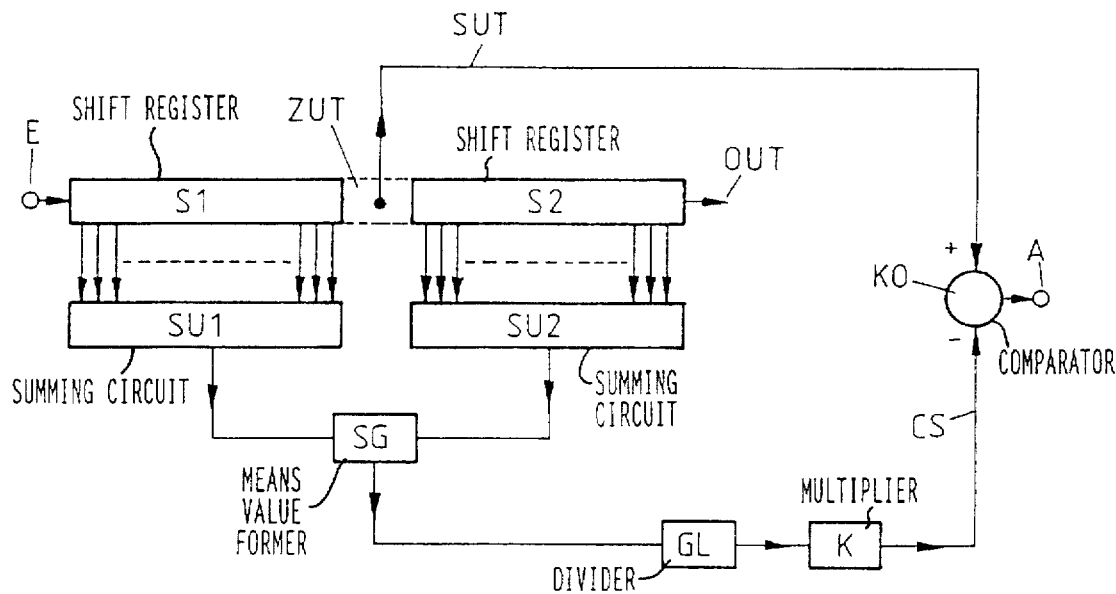
FIGS. 1 and 2 are block circuit diagrams for explaining known embodiments of CFAR circuits.
Figure 2:
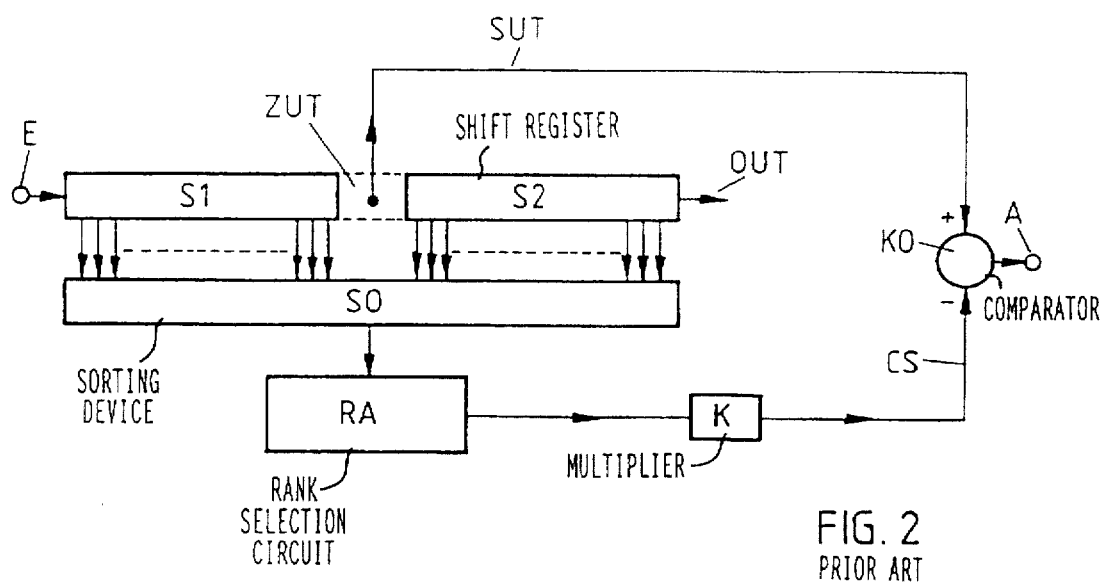

From the above description it ensues that, in a CFAR arrangement according to the prior art (FIGS. 1 and 2), a sample value stored in a storage cell exits the CFAR window at the point OUT (FIGS. 1 and 2) after a threshold value CS has been formed. To this end a new sample value advances into the CFAR window at the input E. A new threshold value CS is determined for the present storage cell population of the CFAR window, and so forth.

In contrast, in the CFAR arrangements and methods according to the invention (FIGS. 3, 5 and 4), a considerably lower outlay is required for realization. This is because, from one threshold value calculation to the next, an entire block of sample values always exits the CFAR window at the point OUT. To this end, an entire block of new sample values always advances into the CFAR window at the input E. This means that the determination of the threshold value CS is always effected in blocks, and the threshold value CS is always kept constant for the number of sample values (storage cells) within a storage block L. This apparent disadvantage in fact does not effect a slightly clutter-adaptive CFAR threshold value if the number of storage cells belonging to a storage block L is not selected to be too large. In other words, the size (number of storage cells) of a storage block L must be adapted to the anticipated clutter situation. This adaptation can be performed experimentally, for example.

The invention is not limited to the described examples, but can also be applied in the same sense to others. For example, the divider stage DL and the multiplier K can be combined to form a multiplier stage, because only a change to the multiplier K is necessary for mathematical reasons.

The invention now being fully described, it will be apparent to one of ordinary skill in the art that any changes and modifications can be made thereto without departing from the spirit or scope of the invention as set forth herein.

What is claimed:

1. A method of generating and using a clutter threshold in a Constant False Alarm Rate (CFAR) circuit arrangement, comprising the steps of:

continuously reading sample values belonging to a digitized video signal into a shift register containing two partial registers separated by a cell under test;

subdividing each partial register into an identical number of storage blocks (L), with each storage block (L) containing a predetermined number of storage cells, and with the number of storage cells in each partial register being adapted to the type and size of the region to be monitored by the arrangement;

summing all sample values stored in a respective storage block to produce a respective block sum for each storage block;

comparing each respective block sum associated with one of the partial register with a respective block sum associated with the other partial register according to a predetermined scheme to determine for each comparison the greater block sum of the two compared block sums;

selecting the smallest block sum from among all of the determined greater block sums, and weighing the selected smallest block sum corresponding to the number of storage cells contained in a storage block (L) and to a predetermined multiplier to produce a clutter threshold (CS); and comparing the clutter threshold with the sample value contained in the cell under test to output only sample values from the cell under test greater than the clutter threshold.

2. A method as defined in claim 1, wherein each storage block (L) contains the same, predetermined number of storage cells.

3. A method as defined in claim 2, wherein the storage blocks (L) contained in each partial register are numbered consecutively in the same order and, during the step of comparing the block sums, comparing block sums from respective storage blocks (L) of the two partial registers having identical numbers.

4. A method as defined in claim 1, wherein the storage blocks (L) contained in each partial register are numbered consecutively in the same order and, during the steps of comparing the block sums, comparing block sums from respective storage blocks (L) of the two partial registers having identical numbers.

5. An arrangement for carrying out the method defined in claim 1, said arrangement comprising:

a shift register divided into two partial registers separated by a storage cell under test, with each partial register being subdivided into the same number of storage blocks (L), each containing a predetermined number of storage cells;

a respective summing member connected with the storage cells of each respective block for adding sample values present in the cells of the associated storage block (L) to provide respective block sums at a respective output, with the respective storage blocks (L) and the respective summing members, of the respective partial registers being numbered consecutively and in the same direction;

a plurality of maximum value detectors each connected to the outputs of respective summing members of the two partial having the identical number, for determining the respectively greater of the two compared block sums;

a minimum value detector connected to the outputs of all of the maximum value detectors for determining the smallest block sum value;

means for weighing the smallest block sum value corresponding to the number of storage cells contained in a storage block (L) and by a predetermined multiplier to form a clutter threshold; and a comparator for comparing the weighted smallest block sum and the sample value stored in the cell under test (ZUT) and for outputting only sample values from the cell under test greater than the weighted smallest block sum.

6. A method of generating and using a clutter threshold in a Constant False Alarm Rate (CFAR) circuit arrangement, comprising the steps of:

continuously reading sample values belonging to a digitized video signal into a shift register containing two partial registers separated by a cell under test;

subdividing each partial register into an identical number of storage blocks (L), with each block (L) containing a predetermined number of storage cells and with the number of storage cells in each partial register being adapted to the type and size of the region to be monitored by the arrangement;

summing all sample values stored in a respective storage block to produce a respective block sum for each storage block;

sorting all of the block sums into a predetermined sequence according the their respective sum values;

selecting a block sum having a predetermined rank from the sequence of block sums;

weighing the selected block sum according to the number of storage cells contained in a storage block (L) and to a predetermined multiplier (K) to produce a clutter threshold (CS); and comparing the clutter threshold with the sample value contained in the cell under test to output only sample valves from the cell under test greater than the clutter threshold.

7. A method as defined in claim 6, wherein each storage block (L) contains the same, predetermined number of storage cells.

8. An arrangement for carrying out the method defined in claim 6, said arrangement comprising:

a shift register divided into two partial registers separated by a storage cell under test, with each partial register being subdivided into a predetermined number of storage blocks (L), each containing a predetermined number of storage cells;

a respective summing member connected with the storage cells of each respective storage block for adding sample values present in the cells of the associated storage block to provide respective block sums at a respective output;

a sorting arrangement, connected to the outputs of all of the summing members of the two partial registers for sorting the block sums into a predetermined sequence;

a rank selector for selecting a block sum having a predetermined rank from the sorted sequence;

means for weighing the selected block sum to the number of storage cells contained in a storage block (L) and by a predetermined multiplier to form a clutter threshold; and a comparator for comparing the produced clutter threshold and the sample value stored in the cell under test (ZUT) and for outputting only sample values from the cell under test greater than the clutter threshold.

9. An arrangement as defined in claim 8, wherein each storage block (L) contains the same, predetermined number of storage cells.

10. An arrangement as defined in claim 8, wherein each partial register contains the same number of storage blocks.

* * * * *